F. A. SMITH.
FISHING ROD TIP.
APPLICATION FILED MAY 19, 1908.
899,914.  Patented Sept. 29, 1908.
*Fig. 1.*  *Fig. 2.*
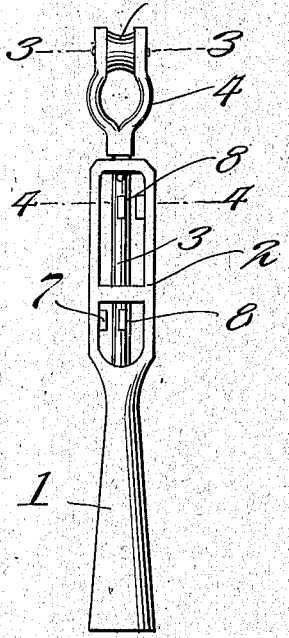 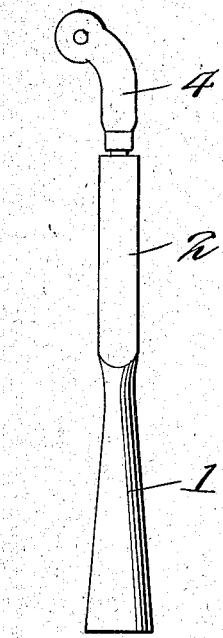
*Fig. 3.*  *Fig. 4.*
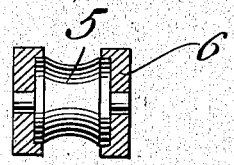 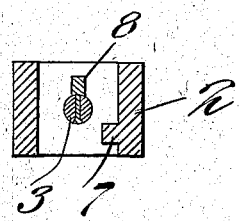
Witnesses
Addison P. Smith
Irving King
Inventor
Frederick A. Smith
By Victor J. Evans
Attorney

UNITED STATES PATENT OFFICE.

FREDERICK A. SMITH, OF HARTFORD, CONNECTICUT.

FISHING-ROD TIP.

No. 899,914.  Specification of Letters Patent.  Patented Sept. 29, 1908.

Application filed May 19, 1908. Serial No. 433,754.

*To all whom it may concern:*

Be it known that I, FREDERICK A. SMITH, a citizen of the United States of America, residing at Hartford, in the county of Hartford and State of Connecticut, have invented new and useful Improvements in Fishing-Rod Tips, of which the following is a specification.

This invention relates to improvements in fishing rod tips and has relation more particularly to line-casting devices.

The primary object of the invention is to provide a novel device of this character wherein means are provided to allow the pulley holder to revolve but half of a circle which prevents the line from being twisted or entangled over the end of the rod.

It is also an object of the invention to provide a device of this character which is simple in construction, efficient in practice and one which may be readily and quickly applied for use and one which may be manufactured at a comparatively low cost.

With the above and other objects in view, the invention consists in the construction, combination and arrangement of parts hereinafter fully described, illustrated and claimed.

In the accompanying drawings,—Figure 1 is a front plan view of a fishing rod tip with my invention applied thereto. Fig. 2 is a side view thereof. Fig. 3 is a detail sectional view taken on line 3—3 of Fig. 1. Fig. 4 is a sectional view taken on line 4—4 of Fig. 1.

Referring more particularly to the drawing, 1 denotes a hollow body portion of a fishing rod tip which is adapted to be readily and quickly applied to or removed from a fishing rod. The bracket 2 is adapted to receive and serve as a swivel for the pulley holder 3. Disposed on the upper end of the pulley holder 3 are curved jaws 4 carrying a pulley 5. The portion 6 of the jaws 4 is countersunk to receive the ends of the pulley and by such arrangement makes the line at all times guided on the pulley. Arranged on the inner sides adjacent the top and bottom of the upper portion 2 of the fishing rod tip are lugs 7 adapted to engage lugs 8 carried by the holder 3, thereby allowing the pulley holder to revolve but half a circle, which prevents the line from being twisted or entangled over the end of the rod. The lugs 8 also prevent the holder from being displaced from the portion 2.

Having thus described the invention, what is claimed as new, is:—

1. A fishing pole tip comprising a hollow body portion, a bracket, a pulley holder carried by the bracket, and means carried by the pulley holder and bracket to allow only partial rotation of the holder.

2. A fishing pole tip comprising a hollow body portion, a bracket, a pulley holder carried by the bracket, and lugs carried by the pulley holder and bracket to allow only partial rotation of the holder.

3. A fishing pole tip comprising a hollow body portion, a bracket arranged thereon, a pulley holder carried by the bracket, jaws fixed to the pulley holder, a pulley secured to the jaws, and means carried by the pulley holder and bracket to allow only partial rotation of the holder.

In testimony whereof I affix my signature in presence of two witnesses.

FREDERICK A. SMITH.

Witnesses:
F. A. WOLTERSDORF,
MORTON D. ALLING.